United States Patent
Oksman (10) Patent No.: US 7,894,483 B2
(45) Date of Patent: Feb. 22, 2011

(54) MULTI-CARRIER COMMUNICATION VIA SUB-CARRIER GROUPS

(75) Inventor: Vladimir Oksman, Morganville, NJ (US)

(73) Assignee: Infineon Technologies AG, Neubiberg (DE)

( * ) Notice: Subject to any disclaimer, the term of this patent is extended or adjusted under 35 U.S.C. 154(b) by 254 days.

(21) Appl. No.: 11/958,589

(22) Filed: Dec. 18, 2007

(65) Prior Publication Data

US 2009/0154927 A1    Jun. 18, 2009

(51) Int. Cl.
*H04J 1/00* (2006.01)
*H04B 7/204* (2006.01)

(52) U.S. Cl. ........................ 370/481; 370/342
(58) Field of Classification Search ............... 370/481
See application file for complete search history.

(56) References Cited

U.S. PATENT DOCUMENTS

| 7,295,518 | B1* | 11/2007 | Monk et al. ............... 370/235 |
| 2002/0118772 | A1 | 8/2002 | Lin |
| 2004/0081191 | A1* | 4/2004 | Kwon et al. ............... 370/431 |
| 2005/0128993 | A1* | 6/2005 | Yu et al. .................. 370/342 |
| 2005/0201474 | A1 | 9/2005 | Cho et al. |
| 2005/0232156 | A1 | 10/2005 | Kim et al. |
| 2007/0036067 | A1* | 2/2007 | Zhang et al. .............. 370/208 |
| 2007/0133708 | A1 | 6/2007 | Lee et al. |
| 2009/0232084 | A1 | 9/2009 | Li et al. |

FOREIGN PATENT DOCUMENTS

| EP | 1564953 A2 | 8/2005 |
| EP | 1569403 A2 | 8/2005 |
| WO | 2007038750 A1 | 4/2007 |

OTHER PUBLICATIONS

European Search Report Dated Dec. 28, 2009 for European Application No. 08172009.6, 15 Pages.
Communication from the European Patent Office Dated Sep. 27, 2010 for European Application No. 08172009.6. 7 Pages.
European Search Report Dated Dec. 28, 2009 for European Application No. 08171999.9, 13 Pages.
Communication from the European Patent Office Dated Sep. 27, 2010 for European Application No. 08171999.9. 6 Pages.
Mohanram C, et al. "Joint Subcarrier and Power Allocation in Channel-Aware Queue-Aware Scheduling for Multiuser OFDM." IEEE Transactions On Wireless Communications, IEEE Service Center, Piscataway, NJ, US, vol. 6, No. 9, Sep. 1, 2007, pp. 3208-3213.
Xi Cao, et al. "Subband Based Adaptive Bit and Power Allocation for OFDM Systems." IEEE International Conference on Wireless Communications, Networking and Mobile Computing, Sep. 1, 2006, pp. 1-4.

* cited by examiner

*Primary Examiner*—Jason E Mattis
*Assistant Examiner*—Stephen J Clawson
(74) *Attorney, Agent, or Firm*—Eschweiler & Associates, LLC (57) ABSTRACT

One embodiment of the present invention relates to a method for communicating over a multi-carrier communication channel. In the method, sub-carrier frequencies that are reserved for communication between a pair of network nodes are associated with different sub-carrier groups, where the sub-carriers of each sub-carrier group are assigned to a bitloading or gain configuration that is independent of the bitloading or gain configurations for the other respective sub-carrier groups. A group message, which is indicative of the bitloading or gain configurations for the respective sub-carrier groups, is transmitted from the receiving node to the transmitting node.

15 Claims, 8 Drawing Sheets

MULTI-CARRIER COMMUNICATION VIA SUB-CARRIER GROUPS

FIELD OF INVENTION

The present invention relates to generally to communication networks and more particularly to adaptive communication networks and local area networks.

BACKGROUND

In today's business climate, industry fortunes rise and fall on whether information is exchanged in an efficient manner. For example, cell phones, pagers, and the Internet have thrived because each technology allows businesses to exchange information over a network. Therefore, to satisfy our society's need for efficient exchange of information, there is an on-going need for improvements in networks.

SUMMARY OF THE INVENTION

The following presents a simplified summary of the invention in order to provide a basic understanding of some aspects of the invention. This summary is not an extensive overview of the invention, and is neither intended to identify key or critical elements of the invention nor to delineate the scope of the invention. Rather, the purpose of the summary is to present some concepts of the invention in a simplified form as a prelude to the more detailed description that is presented later.

One embodiment of the present invention relates to a method for communicating over a multi-carrier communication channel. In the method, sub-carrier frequencies that are reserved for communication between a pair of nework nodes are associated with different sub-carrier groups, where the sub-carriers of each sub-carrier group are assigned a common transmission characteristic that is independent of the transmission characteric for the other sub-carrier groups. Other methods and devices are also disclosed.

The following description and annexed drawings set forth in detail certain illustrative aspects and implementations of the invention. These are indicative of but a few of the various ways in which the principles of the invention may be employed.

DETAILED DESCRIPTION OF THE INVENTION

The present invention will now be described with reference to the drawings wherein like reference numerals are used to refer to like elements throughout, and wherein the illustrated structures are not necessarily drawn to scale. Although various illustrated embodiments are described and illustrated as a hardware structure, the functionality and corresponding features of the present system can also be performed by appropriate software routines or a combination of hardware and software. Thus, the present invention should not be limited to any particular implementation and shall be construed to cover any implementation that falls within the spirit and scope of the claims.

Figure 1:
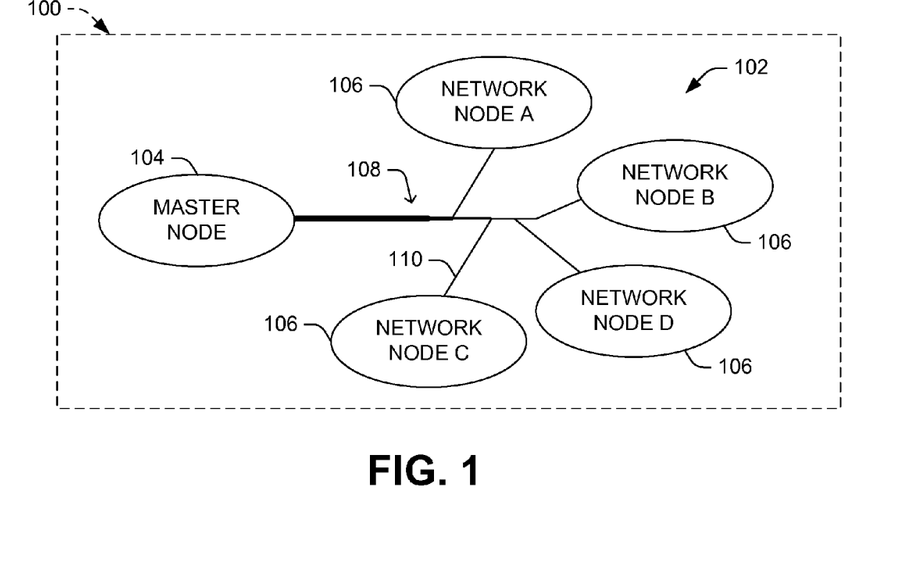
FIG. 1 illustrates one embodiment of a network that transmits data between multiple nodes over a transmission medium.

FIG. 1 illustrates a network 100 that comprises several nodes 102. As shown, the network 100 typically includes at least two types of nodes 102, namely a master node 104 (which is a network controller) and network nodes 106. These nodes 102 are coupled to a transmission medium 108 over which they send and receive signals. The transmission medium 108 may comprise a number of legs 110, each of which may comprise a wireless transmission medium, wireline transmission medium, or combinations thereof.

In one embodiment, the network 100 could be a home network that distributes broadband services from an access network to network nodes at the customer residence, such as TV sets, computers, video-conferencing devices, etc. Thus, a home network may include multiple nodes that are connected to each other by a transmission medium that includes different types of home wiring. Home wiring may include home phone lines, coaxial cable lines, electrical power lines, and dedicated home network wiring, as well as other types of wiring. Often, the wire-lines between the nodes in a home network may be rather short. For example, in some cases, a leg coupling one node to another could be less than 100 ft, which results in low signal attenuation in the leg. However, the presence of multiple legs in the network may cause signal reflections, which often significantly increase signal attenuation.

Reflections between nodes connected by a wireline medium work in the same way as multi-path in wireless networks: they result in addition of a number of symbols delayed by the duration of the additional paths by which they arrive. These added symbols are delayed and phase-shifted, which significant reduces the received signal at some frequencies. Due to reflections, signal attenuation might be very different from one node to another.

For high network performance communication between nodes is structured so that the impact of reflections and interference between nodes is limited. One manner in which communication is regulated is by employing a multi-carrier communication channel, which may use various types of multi-carrier communication, such as orthogonal frequency division multiplexing (OFDM). Multi-carrier modulation breaks the frequency spectrum over which a pair of nodes communicates using a series of sub-carriers. By assigning different bit loading and power gains to each sub-carrier, multi-carrier modulation can accommodate a wide variety of channel transfer functions and noise distributions over a wide frequency range, thus reducing impact of reflections.

To reduce interference between nodes, in some embodiments, the master node 104 is responsible for managing communications resources within the network 100, so that resources are distributed between nodes and collisions are avoided. The master node 104 can further manage communication within the network 100 by assigning each pair of communicating nodes a unique transmission interval during which that pair communicates. For example, the master node 104 could assign Node A and Node B a unique transmission interval reserved exclusively for communication between those two nodes. Each pair's unique transmission interval could be defined by a unique frequency range (e.g., a unique set of sub-carriers), a unique time interval, or a combination thereof.

Figure 2:
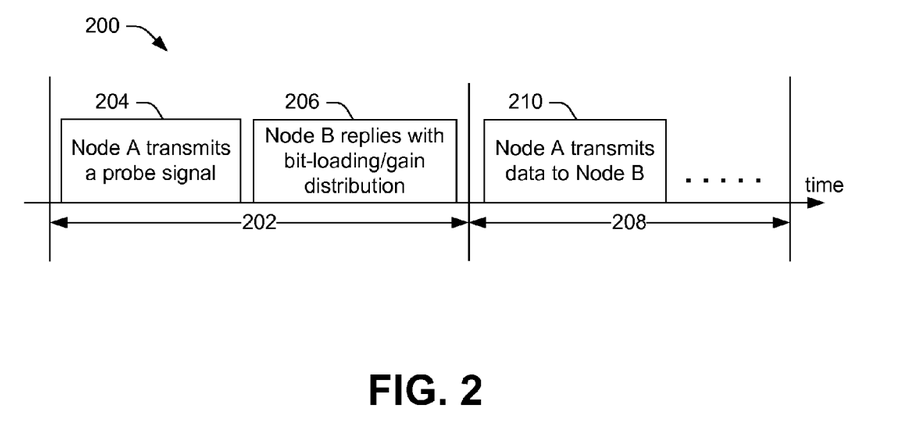
FIG. 2 shows one embodiment of a unique transmission cycle during which a pair of nodes sets or updates a bit-loading or gain distribution.

FIG. 2 shows an example of a unique transmission time interval 200 during which Network Node A communicates with Network Node B. During the first part of the interval 202, Network Node A transmits a probe signal over sub-carriers reserved for communication between Network Node A and Network Node B at 204. Network Node B then analyzes the received probe signal, and based on the received probe signal determines a suitable bit-loading or gain distribution that Network Node A should use for transmission. At 206, Network Node B sends this bit-loading or gain distribution to Network Node A. Finally, in the second part of the interval 208, Network Node A uses the bit-loading or gain distribution to transmit payload data to Network Node B at 210. As the inventors have appreciated and as now discussed in more detail, however, some embodiments of performing this procedure may be unduly burdensome for the network 100.

Figure 3:
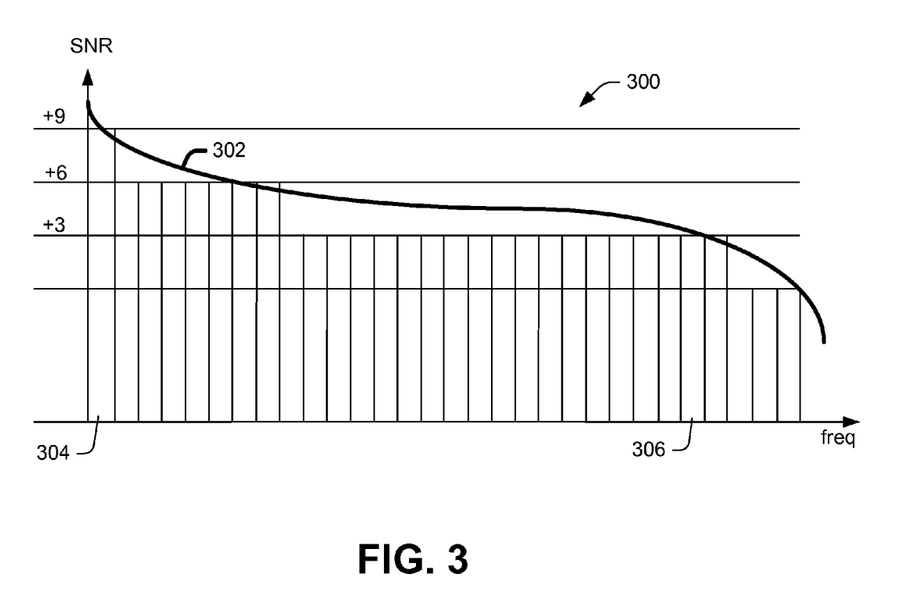
FIG. 3 shows a bit-loading distribution for a number of sub-carriers, where each sub-carrier has bit-loading that is independent of the other sub-carriers.

To further appreciate this shortcoming, FIG. 3 shows an example of a set of sub-carriers with a bit-loading configuration 300 that Network Node A could use to transmit data to Network Node B. The bit-loading distribution 300 is based on a signal-to-noise ratio (SNR) 302 that is measured over the frequency spectrum in which the pair of nodes communicates. Typically, more bits are transmitted on sub-carriers that have a relatively high SNR, while fewer bits are transmitted on sub-carriers that have a relatively low SNR. For example, sub-carrier 304 has a relatively high SNR compared to sub-carrier 306. Correspondingly, more bits will be transmitted on sub-carrier 304, and fewer bits on sub-carrier 306. Notably, each sub-carrier has a bit-loading that is independent of the other sub-carriers.

After Network Node B has determined this bit-loading distribution 300, Network Node B will communicate it to Network Node A as mentioned. However, because the bit-loading for each sub-carrier is independent, the bit-loading table includes a considerable amount of data. For example, consider a scenario where the network nodes communicate over 2,048 sub-carriers, where each sub-carrier could have up to 16 bits loaded onto it per unit time. Further, assume that each sub-carrier has a gain (transmit power) that is independent of the other sub-carriers to accommodate nearest bit loading. For example, if the SNR for a particular sub-carrier is 0.2 dB less than needed to load 10 bits with the given error probability, Node B can ask Node A to increase the transmit power on this particular sub-carrier by 0.2 dB. To compensate for the extra power used on this sub-carrier, the transmitting node will often reduce the transmit power for other sub-carriers that have extra SNR (e.g., 0.2 dB of SNR more than needed to load 10 bits). The following table shows one example of a possible bit-loading and gain adjustment table that could be used to characterize such a scenario:

TABLE 1

Example of a bit-loading and gain-adjustment table for a pair of network nodes that communicate over 2,048 independent sub-carriers.

| Sub-carrier index | Sub-carrier (11 bit identifier) | Bit-loading for sub-carrier (4 bit identifier) | Gain-adjustment for sub-carrier (4 bit identifier) |
| --- | --- | --- | --- |
| 0 | 00000000000 | 1011 | 0000 |
| 1 | 00000000001 | 0101 | 0100 |
| 2 | 00000000010 | 0101 | 0001 |
| ... | ... | ... | ... |
| 2047 | 11111111111 | 0011 | 1100 |

As will be appreciated, if Network Node B were to send this bit-loading and gain-adjustment table to Network Node A, it would need to transmit approximately 40 kilobits of data (i.e., 2048 [sub-carriers]*(11+4+4) [bits/sub-carrier]=38,912 bits). Moreover, in some circumstances this table may be used only in transmitting data from Network Node A to Network Node B (and not vice versa). To transmit data in the other direction (i.e., Network Node B to Network Node A), another full bit-loading and gain-adjustment table may need to be exchanged.

Therefore, if the network 100 includes multiple nodes 102 and each pair of communicating nodes needs to exchange two bit-loading and gain-adjustment tables, the network 100 will require the exchange of a significant amount of data to setup and/or update the bit-loading and gain-adjustment tables. Consequently, the nodes 102 will require a long time period to establish and update their connections, even if the bit rate for the network is relatively high. In some cases, when the communication channel is stable, and a rather long training period is acceptable, this long parameter exchange between nodes is acceptable. An example of this is ADSL, where long bit loading and gain-adjustment tables are exchanged during the initialization. However in other environments, such as home-networks or wireless networks, the channel characteristics are changing rapidly. In many cases, the long time period required to exchange bit-loading and gain-adjustment tables is longer than the steady state of the network during which noise parameters are constant. Therefore, this long time period limits the network's ability to adapt to rapidly changing noise, making high performance connections difficult if not impossible.

In appreciating these shortcomings and limitations, the inventors have devised systems, devices, and methods for efficiently setting up and updating network connections over a multi-carrier channel. Depending on the implementation, these systems, devices, and methods may group sub-carriers the into multiple sub-carrier groups, where each sub-carrier group has a transmission characteristic that is independent of the other sub-carrier groups. The transmission characteristic could relate to a bit-loading distribution, a gain distribution, or any other transmission characteristic, as well as combinations thereof.

Figure 4:
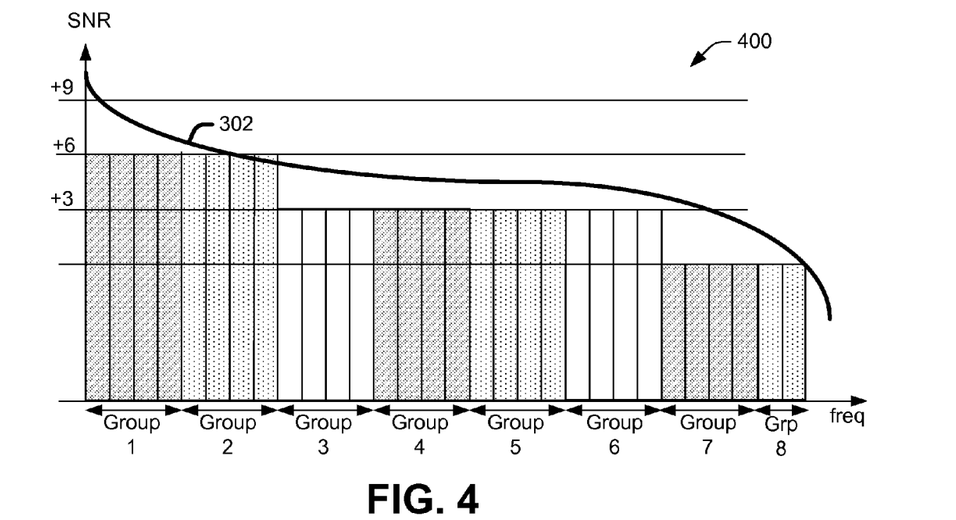
FIG. 4 shows a bit-loading distribution for a number of sub-carrier groups, where each sub-carrier group has bit-loading that is independent of the other sub-carrier groups.

FIG. 4 shows an example where the sub-carriers are associated with a pair of nodes and have been grouped into eight sub-carrier groups (Group 1, Group 2, . . . , Group 8), and each sub-carrier group has a flat bit-loading distribution that is independent of the other sub-carrier groups. For example, all of the sub-carriers in Group 1 could have approximately a first number of bits per unit time loaded thereon, all of the sub-carriers in Group 2 have approximately the first number of bits per unit time loaded thereon, all of the sub-carriers in Group 3 have approximately a second number of bits per unit time loaded thereon, and so on; where the bit-loading for each group could be selected as a function of the SNR in that group's frequency range.

Although FIG. 4 shows sub-carrier groups that include four adjacent sub-carriers, in other embodiments, the sub-carrier groups could include any number of sub-carriers and could include non-adjacent sub-carriers instead of adjacent sub-carriers. With that said, because adjacent sub-carriers tend to have similar bit-loading, it may be particularly advantageous for sub-carrier groups to have adjacent sub-carriers, which allows for efficient encoding of sub-carrier group parameters. For example, using sub-carrier groups with adjacent sub-carriers is it is not necessary to communicate the group index if the protocol communicates bit loadings of consecutive groups in the same order. Typically, the size of the group depends on the steepness of the slopes of the frequency response of the channel over frequency: for steep slopes smaller groups are often selected. The accuracy of bit loading for a sub-carrier group of the given size and sub-carrier spacing depends on the frequency response and the noise characteristics of the media (i.e., on media oscillations in frequency domain.)

Although FIG. 4 shows an example where each sub-carrier group has a flat bit-loading distribution, it will be appreciated that in other embodiments each sub-carrier group could also follow another curve-fitting function (e.g., a non-flat bit-loading distribution), thereby providing more precise channel characterization. For example, a linearly increasing bit-loading scheme could also be used, where successive bits in a sub-carrier group include an increasing number of bits per unit time. Linearly decreasing bit-loading, Gaussian bit-loading, and many other bit-loading distributions could be used. Thus, in various embodiments, sub-carriers in a non-flat bit-loading distribution could have a number of bits per unit time that varies as a function of sub-carrier indices associated with the respective sub-carriers, where all such embodiments are contemplated as falling within the scope of the invention.

To highlight one manner in which the sub-carrier groups may be beneficial, again consider the scenario where a pair of nodes uses 2,048 sub-carriers. However, instead of the 2,048 sub-carriers each having an independent bit-loading as previously discussed with reference to Table 1, now assume that the sub-carriers are grouped into eight sub-carrier groups, where the sub-carriers within each sub-carrier group follow a common bit-loading distribution (e.g., a flat-bit-loading distribution). The following table shows one example of an encoding scheme consistent with this scenario:

TABLE 2

Example of a bit-loading table for a pair of network nodes that communicate via 2,048 sub-carriers grouped into 8 sub-carrier groups.

| Group index | Group identifier (3 bit identifier) | Bit-loading for sub-carriers in the Group (4 bit identifier) |
|---|---|---|
| 0 | 000 | 1011 |
| 1 | 001 | 1011 |
| 2 | 010 | 0101 |
| ... | ... | ... |
| 7 | 111 | 0010 |

As will be appreciated, if a node wanted to transmit this bit-loading table, the node would need to transmit only 56 bits of data (i.e., 8 [groups]*(3+4) [bits/group]=56 b). Therefore, although this grouping process does not immediately characterize the multi-carrier channel as precisely as Table 1's example, this grouping process requires significantly less overhead, thereby allowing the network nodes to quickly update their bit-loading distributions to adapt to rapidly changing noise conditions.

Figure 5:
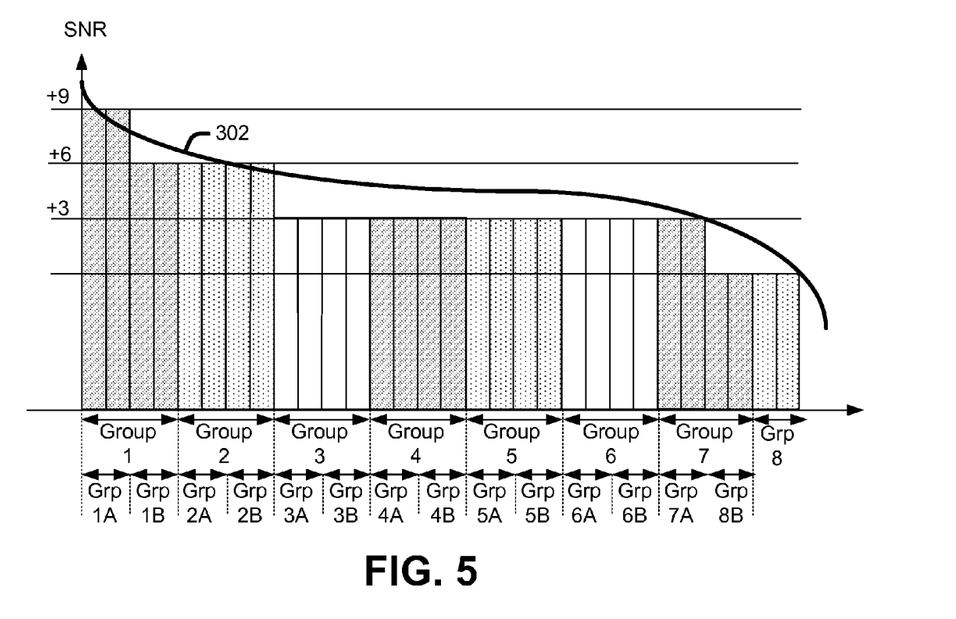
FIG. 5 shows a bit-loading distribution where the sub-carrier groups have been divided into sub-groups.

To more accurately characterize the multi-carrier channel, in some embodiments the sub-carrier groups may be iteratively divided into sub-groups, such as shown in FIG. 5. For example, Group 1 has been sub-divided into two sub-groups: Group 1A and Group 1B. These sub-groups allow the nodes to more precisely characterize the multi-carrier channel. As mentioned above with respect to the sub-carrier groups, the sub-groups could include any number of sub-carriers and could include non-adjacent sub-carriers as well as adjacent sub-carriers.

Figure 6A:
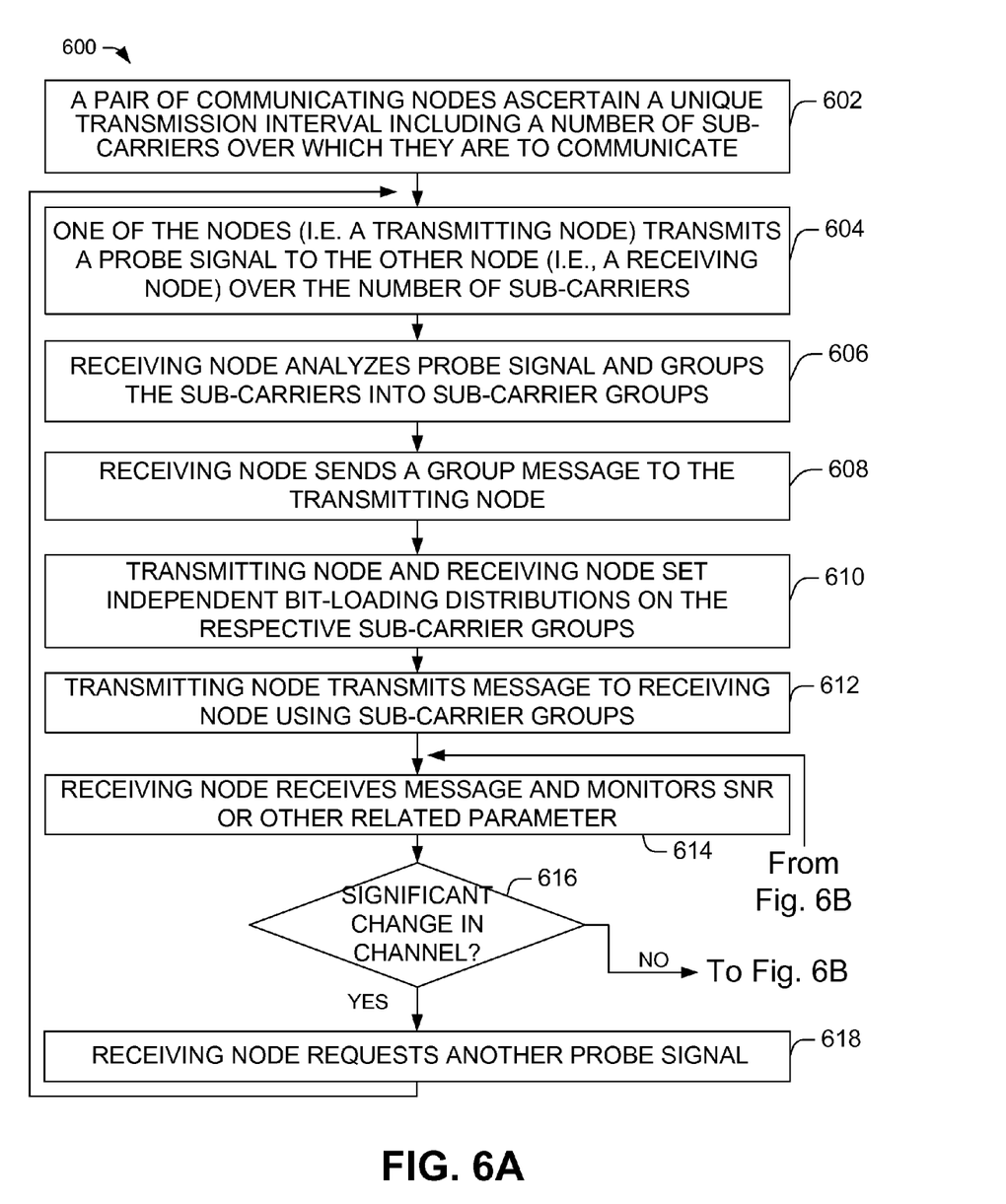
FIGS. 6A-6B show a flowchart illustrating a method of multi-carrier communication that uses sub-carrier groups that have independent bit-loading distributions.
Figure 6B:
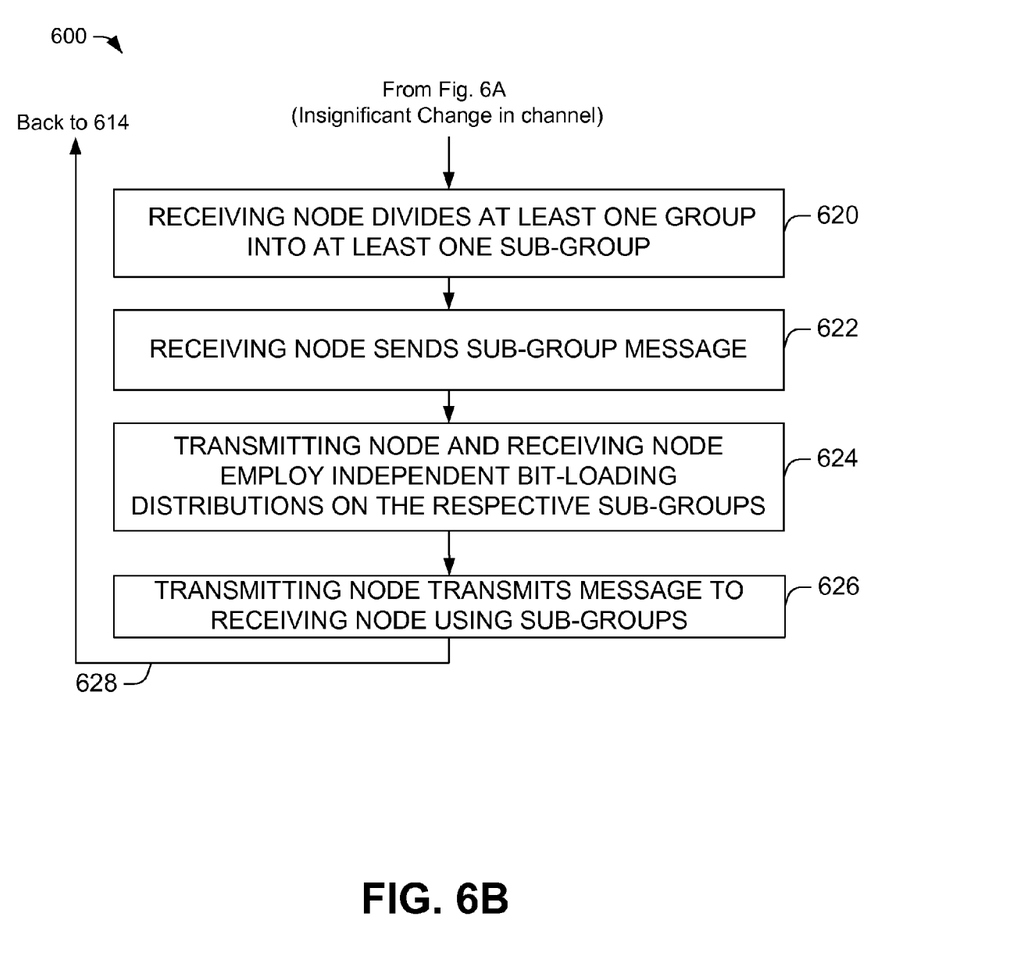

Turning now to FIG. 6, one can see a somewhat general method for establishing a multi-carrier channel that employs sub-carrier groups in accordance with some aspects of the invention. As can be seen, the method also allows for the sub-carrier groups to be iteratively divided into sub-groups, which can more accurately characterize the multi-carrier channel, and may be used to account for dynamic noise characteristics in some embodiments. While this method is illustrated and described below as a series of acts or events, it will be appreciated that the present invention is not limited by the illustrated ordering of such acts or events. For example, some acts may occur in different orders and/or concurrently with other acts or events apart from those illustrated and/or described herein. In addition, not all illustrated steps may be required to implement a methodology in accordance with one or more aspects or embodiments of the present invention. Further, one or more of the acts depicted herein may be carried out in one or more separate acts and/or phases.

In 602, a pair of communicating nodes ascertains a unique transmission interval that includes multiple sub-carriers over which the nodes are to communicate. In various embodiments, the master node could assign the pair of nodes the unique transmission cycle. Alternatively, the pair of nodes could communicate via a sub-carriers specified by a manufacturer's requirements, using another way to access the media, with or without receiving input from a master node.

At 604, one of the pair of nodes (i.e., a transmitting node) transmits a probe signal to the other node (i.e., a receiving node). This probe signal is transmitted over the sub-carriers associated the unique transmission interval for the pair of nodes. In one embodiment, the probe signal may be a test message with pre-defined signal shape or pre-defined constellation points for each used sub-carrier, or an actual data message transmitted with pre-defined bit-loading over all sub-carriers associated with the nodes.

At 606, the receiving node analyzes the probe signal and groups the sub-carriers into different sub-carrier groups, where each sub-carrier group has a transmission characteristic that is independent of the transmission characteristic other sub-carrier groups. Forming of the groups may be different for different implementations. Generally, the receiving node performs the grouping in the way that reduces transmission overhead. In one implementation the receiver may indicate the number of groups, while both sides are aware that groups have equal size and divide the spectrum accordingly. In another implementation, the receiver may send the size of the group following by the bit loading in a data format [5, 3] (means a group of 5 tones with 3 bits loaded on each tone). A sequence of data formats will describe to the transmitter how to assign groups and the bit-loading of each.

At 608, the receiving node sends, as an acknowledgement, a group message (or series of group messages) to the transmitting node. The group message indicates the independent bit-loading distributions for the respective sub-carrier groups.

At 610, the transmitting node and receiving node set independent bit-loading distributions on the respective sub-carrier groups. Then in 612, the transmitting node transmits the data message (which may carry management or payload data) using the sub-carrier groups with their independent bit-loading distributions.

In 614, the receiving node receives the data message and analyzes the channel using the received data message, potentially using this information to update the bit loading and gain adjustment table for the next data message.

If the receiving node determines there is a relatively insignificant change in the channel (NO at 616), (i.e., concludes that the SNR on most of the sub-carriers remains unchanged from the previous data message or probe signal) the method 600 proceeds to FIG. 6B as shown. Thus, at 620 to more accurately characterize the multi-carrier channel, the receiving node divides at least one sub-carrier group into at least one sub-group.

At 622, the receiving node sends a sub-group message (or a series of sub-group messages) to the transmitting node. The sub-group message indicates the independent bit-loading distributions for the respective sub-groups.

At 624, the transmitting node and receiving node set the independent bit-loading distributions on the respective sub-groups; after which the transmitting node transmits a data message to the receiving node using the sub-groups with their independent bit-loading distributions at 626. At 628, the method returns to 614 in FIG. 6A where the receiving node receives the data message and continues analysis of the channel characteristics using the received data messages or probe signals to update the bit loading and gain adjustment table.

Therefore, by repeating this process (614-628), the nodes may iteratively divide the sub-groups into smaller sub-groups, send additional sub-group messages indicative of the new sub-groups, and then employ the sub-groups for communication. In this manner, the nodes can rather quickly reach a condition where the size of each sub-group is one sub-carrier. Thus, extremely precise channel characterization is possible, but without unduly burdensome overhead.

If there is a significant change in the channel as determined by the receiving node after it receives a data message ("YES" at 616 of FIG. 6A), the bit-loading and gain adjustment table used for communication of the data message may not fit any more the channel characteristics. As shown, in this scenario, the receiving node requests an additional probe signal in 618 to re-estimate the bit loading and gain adjustment table. The transmitting node sends another probe signal in 604 and the method proceeds as previously discussed. This probe signal, same as discussed previously, may be a test message with pre-defined signal shape or with pre-defined constellation points for each used sub-carrier, or a data message transmitted with pre-defined bit-loading over all sub-carriers associated with the nodes. In the latter case the receiving node sends a group reset message, which indicates the sub-carrier groups, with corresponding bit loading and gain adjustment for the data message to be transmitted.

Figure 7:
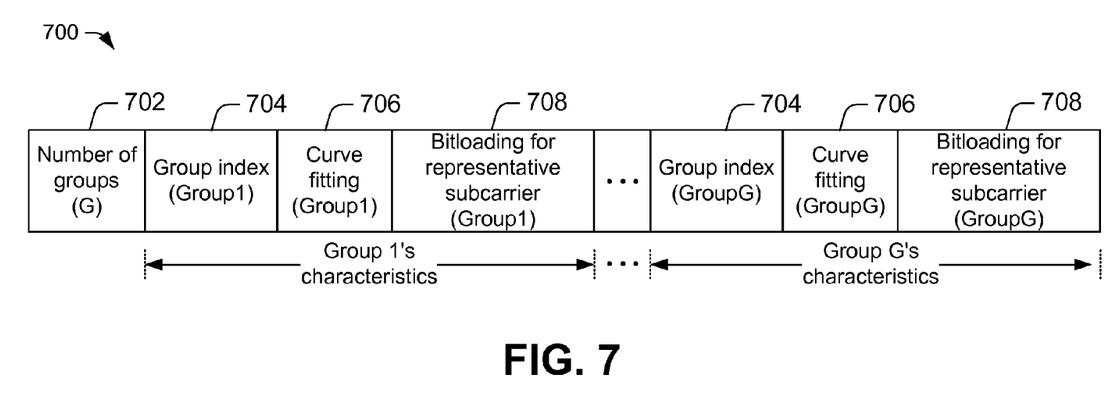
FIG. 7 and FIG. 8 show example message formats that could be used to communicate the sub-carrier groups and sub-groups, respectively.

Referring now to FIG. 7, one can see an example of a message format 700 that could be used for the group message. In the illustrated embodiment, a number field 702 specifies the number of sub-carrier groups to be employed, and subsequent fields are grouped to specify the characteristics of the various sub-carrier groups. Thus, each sub-carrier group may be characterized by a group index field 704 that uniquely identifies the sub-carrier group, a curve fitting field 706 that specifies the type of curve fitting to be used for that sub-carrier group (e.g., flat bit-loading or non-flat bit-loading), and a bit-loading field 706 that includes a bit-loading value for a representative sub-carrier in the sub-carrier group. In other embodiments, the grouping message need not include all of the illustrated fields, and/or could include additional fields not shown.

Figure 8:
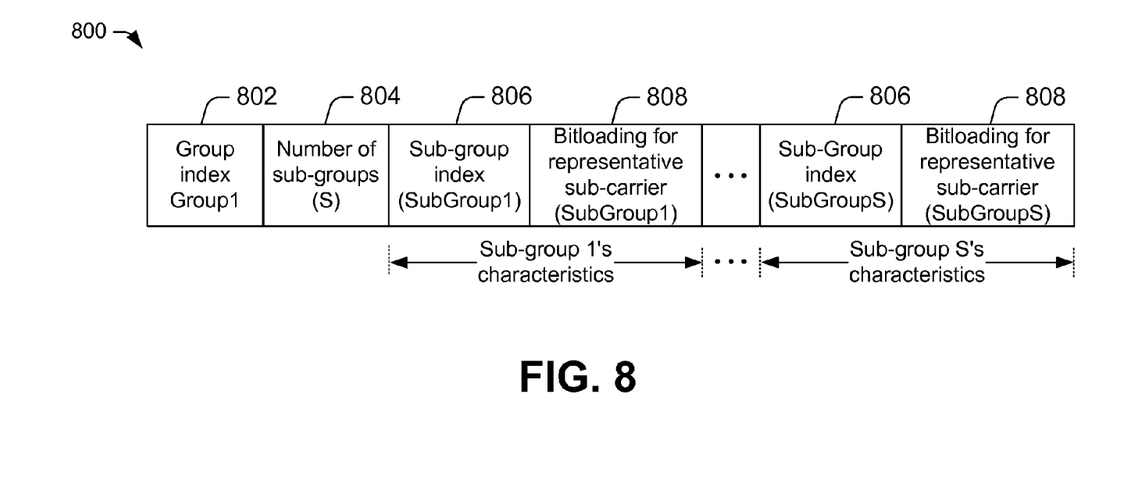

Referring now to FIG. 8, one can see an example of a message format 800 that could be used for the sub-group messages. In the illustrated embodiment, a group index field 802 specifies the group that is to be divided into subgroups, a number field 804 indicates the number of sub-groups into which the group is to be divided, and subsequent fields specify the characteristics of the various sub-groups. Thus, each sub-group may be characterized a sub-group index field 806, a curve fitting field (not shown), and a bit-loading field 808 that includes a bit-loading value for a representative sub-carrier in the sub-group. In other embodiments, the sub-grouping messages need not include all of the illustrated fields, and/or could include additional fields not shown.

In most of implementations the size of the sub-group messages is kept in the same range as the group messages to keep the data message overhead constant. As an example, if the group message includes J groups, the sub-group message will describe J sub-groups. For instance, if the first sub-group message describes the J first halves of J groups, and the second sub-group message will describe the J second halves of J groups.

One important embodiment is when the group/sub-group message is communicated as part of a data message sent by the receiver. In other words, a header could identify the start of the data message, which includes payload or management data as well as the group/sub-group information. In some embodiments, this data message could also include another probe signal. If included in the data message, the group/sub-group information could be included at pre-defined bit positions in the data message, and a probe signal can be included as a part of the message preamble. This further reduces the overhead in comparison to embodiments where the group/sub-group message and/or probe signal is communicated as a stand-alone message with its own header.

Some of the examples above have been described in the context of Network Node A sending a probe signal to Network Node B, after which Network Node B responds with a bit or gain loading table. In some practical embodiments, however, each node in the network communicates with several other nodes. Therefore, each node will often want to setup or update bit-loading or gain adjustment tables with all of the nodes with which it communicates. For example, if network node A communicates with network nodes B and C, and network node B communicates with network nodes C, D, and E, each node may need to update its bit-loading and gain adjustment tables with every node with which it communicates. This may take a considerable amount of time if there are multiple nodes and many sub-carriers. Although sub-carrier grouping as described above reduces the time for setting up and updating connections, sub-carrier grouping alone may still be insufficient. Therefore, FIGS. 9 and 10 shows some examples of methodologies that may further limit the time for setting up and updating connections.

Figure 9:
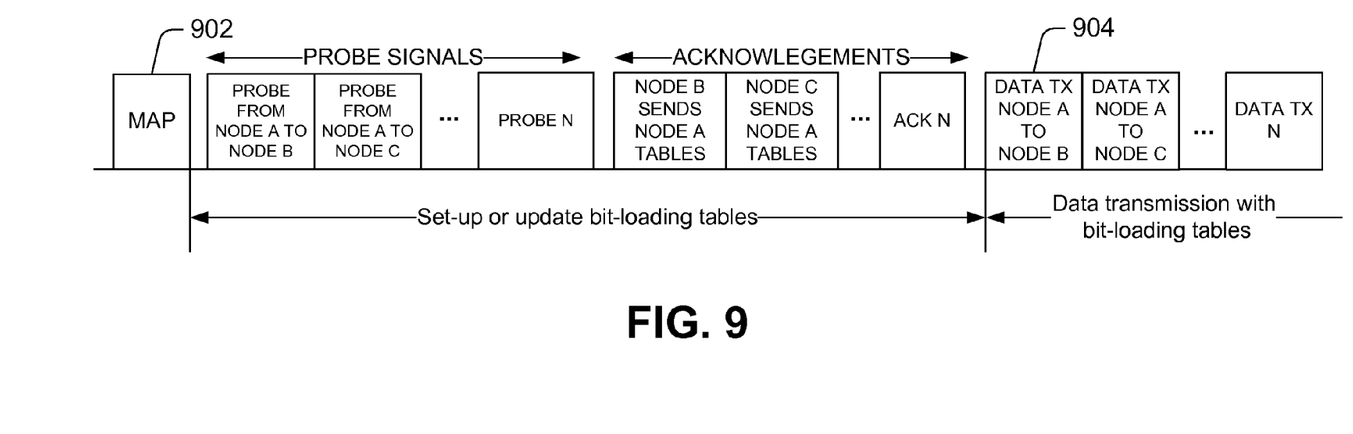
FIG. 9 shows a timeline of one example of a protocol for updating bit-loading tables if rapidly changing noise conditions exist on a multi-carrier channel.
Figure 10:
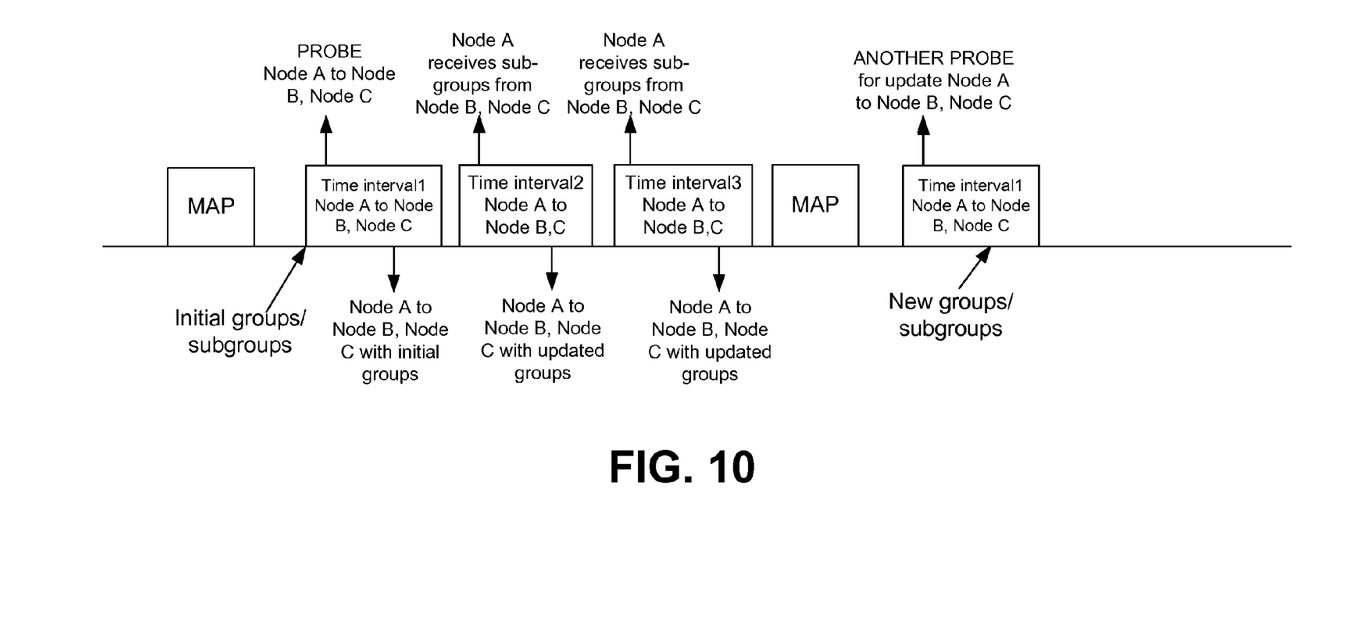
FIG. 10 shows a timeline of one example of a protocol for updating bit-loading tables if noise conditions are relatively constant on a multi-carrier channel.

Referring now to FIG. 9, if noise conditions are changing rapidly, it may be beneficial to update each node's bit-loading table just before that node transmits data over the network. To facilitate this behavior, the master node broadcasts a Media Access Plan (MAP) 902 to all of the nodes on the network. The MAP includes a transmission schedule for each of the nodes associated with the network, in which each node is assigned a unique transmission time interval. Each node's transmission interval may specify a time during which the node is to transmit a probe signal, and may also specify another time during which the node is to transmit data messages.

With this in mind, one can see that communication is structured so that the transmitting nodes send probe signals one after another. For example, Network Node A could send a probe signal to Network Node B during a first time interval, Network Node A could send a probe signal to Network Node C during a second time interval, and so on. After the probe signals are transmitted, the receiving nodes send group and/or sub-group messages in turn, which include bit-loading and/or gain adjustment tables that specify suitable sub-carrier groups. These group and/or sub-group messages are often transmitted using robust communication techniques, such as encoding techniques with high redundancy, using low bit loadings (e.g., BPSK or QSPK), and/or repeating the same information in frequency and time domains.

After the bit-loading and/or gain adjustment tables have been updated, the nodes transmit data messages with the updated bit-loading tables during their uniquely assigned transmission interval. For example, Network Node A transmits data to Network Node B during interval 904. With this arrangement, data should be safely transmitted unless noise conditions change during the short time period between when a node transmits its probe signal and when it finishes data transmission. Some implementations use a single unified probe signal which can serve for bit-loading update for all nodes (e.g., a signal where each sub-carrier has a predefined constellation point). This saves transmission time for setup and update bit-loading and gain adjustment tables.

Referring now to FIG. 10, for less frequent changes, there may be no special time reserved for the probe signal, but rather the probe signal could be sent anytime during a node's transmission interval. Thus, in FIG. 10 there is no special time reserved for a probe signal because the probe signal is a part of the data message transmitted during the transmission interval. The probe signal could be implemented as a special data message or as a part of a regular data message or regular management message. If the probe signal is sent as a separate signal message, after the probe signal is transmitted, the data is transmitted with the same loading tables as defined after the latest update. The new update is expected in the same or one of the next transmission intervals. This arrangement can be used also for so called "blind" training, when probe signal is a part of the data message (like preamble) or the data message itself is used as a probe signal.

Figure 11:
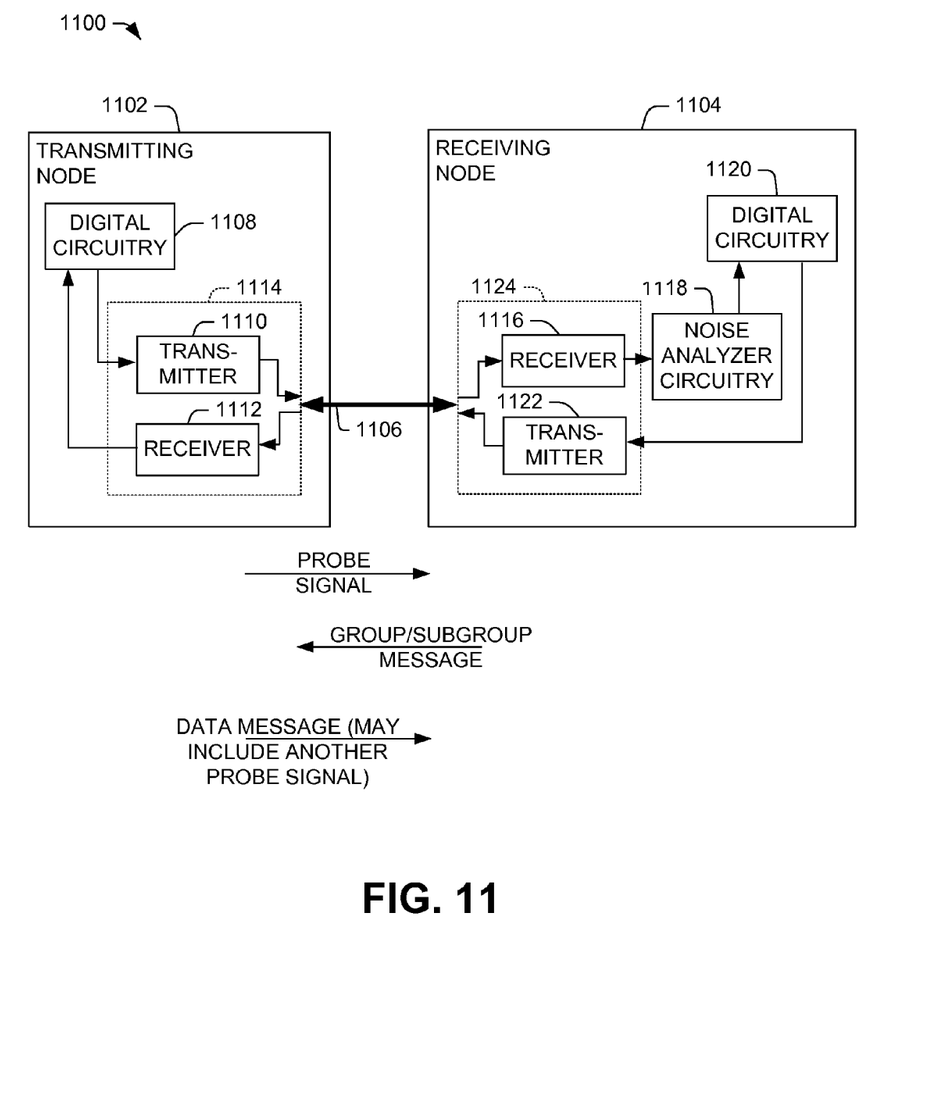
FIG. 11 shows one embodiment of a transmitting node and a receiving node that include circuitry to implement the functionality described herein.

In view of the previously discussed figures and accompanying discussion, reference is now made to FIG. 11, which shows a pair of communicating nodes 1100 including a transmitting node 1102 and a receiving node 1104, each having circuitry to enable the functionality previously described. Although each node is shown as either a receiving node or a transmitting node, it will be appreciated that in many embodiments, each node could act as both a transmitting node and a receiving node and would have suitable circuitry to facilitate this functionality.

To facilate data transmission over the transmission medium 1106, the transmitting node 1102 may include digital circuitry 1108 (e.g., a microcontroller, microprocessor, application specific integrated circuit (ASIC), digital signal processor (DSP)) to initially structure the probe signal (which can be a special signal with predefined parameters or a data message, or a part of data message, e.g., preamble), as well as a transmitter 1110 configured to transmit the probe signal The transmitting node 1102 may also include a receiver 1112 (where transmitter 1110 and receiver 1112 may collectively be referred to as a transceiver 1114) configured to receive a group message or sub-group message. The digital circuitry 1108 can then parse the group/sub-group message and, in conjunction with the transmitter 1110, adapt communication to transmit a data message (which could include another probe signal) using the sub-carrier groups or sub-groups specified in the group/sub-group message.

To faciliate reception of data over the transmission medium 1106, the receiving node 1104 may also include a receiver 1116 to receive the probe signal and data messages. The receiving node 1104 may also include noise analyzer circuitry 111 8 and digital circuitry 11 20 (e.g., a microcontroller, microprocessor, application specific integrated circuit (ASIC), digital signal processor (DSP)) for analyzing the probe signal and determining suitable sub-carrier groups or sub-groups therefrom. In addition, the receiving node may also include a transmitter 1122 for transmitting a group or sub-group message, where the receiver 1116 and transmitter 1122 may collectively be referred to as a transceiver 1124.

In some embodiments, a pair of communicating nodes could update bit-loading values and gains for all sub-carriers within each sub-carrier group. In other embodiments, however, the nodes could update only their bit-loading values, while their gains settings remained constant. While this is may not be as efficient as updating both bit-loading values and gain settings, it may reduce the amount of data that needs to be communicated. Similarly, in other embodiments, the gain settings could be adjusted while the bit-loading values remain constant.

While examples of the invention have been illustrated and described with respect to one or more implementations, alterations and/or modifications may be made to the these examples without departing from the spirit and scope of the appended claims. For example, although various illustrated embodiments are described and illustrated as a hardware structure, the functionality and corresponding features of the present device can also be performed by appropriate software routines or a combination of hardware and software. In regards to software implementations, the software may be read from a "computer readable medium", which includes any medium that participates in providing instructions to a node or to digital circuitry associated with the node. Such a medium may take numerous forms, including but not limited to, non-volatile media, volatile media, and transmission media. Non-volatile media includes, but is not limited to: magnetic disks, flash disks, EEPROM, and optical disks such as CDs or DVDS. Volatile media includes dynamic memory, including but not limited to: SRAM or DRAM. Transmission media includes, but is not limited to: coaxial cables, copper wire, fiber optics, etc., and busses internal or external to a node. Transmission media can also include electromagnetic waves, such as a voltage wave, light wave, or radio wave.

In regard to the various functions performed by the above described components or structures (blocks, units, nodes, assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method for communicating over a multi-carrier communication channel of a network, comprising:
   ascertaining a number of subcarriers over which a transmitting node and a receiving node in the network are to exchange a communication signal;
   grouping the number of sub-carriers into sub-carrier groups, at least one sub-carrier group having multiple sub-carriers and each sub-carrier group having a bitloading or gain configuration that is independent of the bitloading or gain configurations respectively associated with the other sub-carrier groups;
   transmitting a group message indicative of the bitloading or gain configurations for the respective sub-carrier groups from the receiving node to the transmitting node, where the group message comprises:
      a number field that indicates the number of sub-carrier groups;
      a group index that uniquely identifies a sub-carrier group; and
      a bit-loading or gain value for a representative sub-carrier in the identified sub-carrier group.

2. The method of claim 1, where a first sub-carrier group has a first flat bit-loading distribution in which each sub-carrier within the first sub-carrier group has a first number of bits per message to be loaded thereon, and a second sub-carrier group has a second flat bit-loading distribution in which each sub-carrier within the second sub-carrier group has a second number of bits per message to be loaded thereon, the first number of bits being different from the second number of bits.

3. The method of claim 1, where a first sub-carrier group has a first non- flat bit-loading distribution in which sub-carriers within the first sub-carrier group have a number of bits that varies as a function of sub-carrier indices associated with the respective sub-carriers of the first sub-carrier group, and a second sub-carrier group has a second non-flat bitloading distribution in which sub-carriers within the second sub-carrier group have a number of bits that varies as a function of sub-carrier indices associated with the respective sub-carriers of the second sub-carrier group.

4. The method of claim 3, where the first non-flat bit-loading distribution and the second non-flat bitloading distribution follow the same function.

5. The method of claim 1, where the network nodes are configured to be used in a network that includes more than two network nodes.

6. The method of claim 5, where the multi-carrier communication channel is established over a wireline medium.

7. A method for communicating over a multi-carrier communication channel, comprising:
   receiving a probe signal from a transmitting node over sub-carrier frequencies on which the transmitting network node communicates with a receiving network node;
   assigning the sub-carrier frequencies to different sub-carrier groups as a function of the received probe signal, where multiple sub-carriers in each sub- carrier group follow a bitloading or gain configuration that is independent of the bitloading or gain configurations respectively associated with the other sub- carrier groups; and
   after the sub-carriers are assigned to different sub-carrier groups, dividing subcarriers of a sub-carrier group into two or more sub-groups, where the sub-carriers of each sub-group are assigned a common bitloading or gain configuration that is independent of the respective bitloading or gain configurations for the other sub-groups within the sub-carrier group; and
   transmitting a sub-grouping message indicative of the independent transmission bitloadinq or gain configurations for the respective sub-groups to the transmitting node, where the sub-grouping message comprises: a number field that indicates the number of sub-groups, a sub-group index that uniquely identifies a sub-group, and a bit-loading or gain value for a representative sub-carrier in the identified sub-group.

8. The method of claim 7, where the transmitting network node and receiving network node are configured to be used in a network that includes more than two network nodes.

9. The method of claim 7, where the multi-carrier communication channel is established over a wireline medium.

10. The method of claim 7, where the sub-carriers within a sub-carrier group are adjacent sub-carriers.

11. The method of claim 7, where the sub-carriers with a sub-carrier group are non-adjacent sub-carriers.

12. A receiving network node configured to be associated with a network having a number of nodes, comprising:
   a receiver configured to receive a probe signal over sub-carrier frequencies that are reserved for communication with a transmitting node;
   noise analyzer circuitry configured to analyze the received probe signal and determine a number of bits that the transmitting node should load onto each of the sub-carrier frequencies and further configured to group the sub-carrier frequencies into multiple sub-carrier groups, at least one sub-carrier group having multiple sub-carriers, where the sub-carriers within each sub-carrier group share a common transmission characteristic that is independent of the other sub-carrier groups;
   a transmitter configured to transmit at least one group message to the transmitting node, where the group message includes a number field that specifies the number of sub-carrier groups to be employed and subsequent fields that specify the characteristics of the sub-carrier groups;
   where the transmitter is further configured to transmit at least one sub-group message specifying to divide sub-carriers of a sub-carrier group into two or more sub-groups, each sub-group having sub-carriers that follow a common transmission characteristic that is independent of the transmission characteristics for the other sub-groups.

13. The receiving network node of claim 12, where a header identifies a data message that includes payload or management data and the group message.

14. The receiving network node of claim 12, where the network is a network with more than two network nodes.

15. A method for communicating over a multi-carrier communication channel, comprising:
   receiving a probe signal from a transmitting node over sub-carrier frequencies on which the transmitting network node communicates with a receiving network node;
   assigning the sub-carrier frequencies to different sub-carrier groups as a function of the received probe signal, where multiple sub-carriers in each sub- carrier group follow a bitloading or gain configuration that is independent of the bitloading or gain configurations respectively associated with the other sub- carrier groups; and transmitting a group message indicative of the bitloading or gain configurations for the respective sub-carrier groups to the transmitting node;
where the group message comprises:
 a number field that indicates the number of sub-carrier groups;
 a group index that uniquely identifies a sub-carrier group; and
 a bit-loading or gain value for a representative sub-carrier in the identified sub-carrier group.

* * * * *